(12) United States Patent
Darlet

(10) Patent No.: US 10,857,723 B2
(45) Date of Patent: Dec. 8, 2020

(54) STRETCHING MACHINE FOR STRETCHING THERMOPLASTIC FILMS

(71) Applicant: Jean-Pierre Darlet, Shanghai (CN)

(72) Inventor: Jean-Pierre Darlet, Shanghai (CN)

( * ) Notice: Subject to any disclaimer, the term of this patent is extended or adjusted under 35 U.S.C. 154(b) by 463 days.

(21) Appl. No.: 15/911,284

(22) Filed: Mar. 5, 2018

(65) Prior Publication Data

US 2019/0184626 A1    Jun. 20, 2019

(30) Foreign Application Priority Data

Dec. 15, 2017 (FR) ..................................... 17 62211

(51) Int. Cl.
| | | |
|---|---|---|
| *B29C 55/16* | (2006.01) | |
| *B29C 37/00* | (2006.01) | |
| *B29C 55/20* | (2006.01) | |
| *B29K 101/12* | (2006.01) | |
| *B29L 7/00* | (2006.01) | |

(52) U.S. Cl.
CPC ............ *B29C 55/165* (2013.01); *B29C 37/00* (2013.01); *B29C 55/20* (2013.01); *B29C 2037/90* (2013.01); *B29K 2101/12* (2013.01); *B29L 2007/008* (2013.01)

(58) Field of Classification Search
CPC ... B29C 2037/90; B29C 37/00; B29C 55/165; B29C 55/20; B29C 55/16; B29K 2101/12; B29L 2007/008; B66F 13/005; B65H 2402/524
USPC ....................................................... 264/40.1
See application file for complete search history.

(56) References Cited

U.S. PATENT DOCUMENTS 3,491,402 A * 1/1970 Koyama ................. B29C 55/20
                                                                 26/73
3,932,919 A * 1/1976 Hutzenlaub ........... B29C 55/165
                                                                 26/73

FOREIGN PATENT DOCUMENTS

| CN | 102848568 | 1/2013 |
|---|---|---|
| CN | 103434128 | 12/2013 |
| DE | 1635182 A1 | 6/1971 |
| DE | 2535032 B1 | 11/1976 |
| FR | 2924048 | 5/2009 |
| GB | 981677 A | 1/1965 |
| GB | 1013627 A | 12/1965 |
| GB | 2007736 A | 5/1979 |

\* cited by examiner

*Primary Examiner* — Matthew J Daniels
*Assistant Examiner* — Yunju Kim
(74) *Attorney, Agent, or Firm* — Defillo & Associates, Inc; Evelyn A Defillo

(57) ABSTRACT

The machine (1) includes at least one assistance subassembly (10) having: an endless chain or belt (16); a plurality of thrust members (20) connected to the chain or belt (16) in succession and projecting from the chain or belt (16), and a drive device (21) of this chain or belt (16), several thrust members (20) are brought into the path (3) of the sliders (8) connected to the grippers (4) for gripping the film (F), so that at least one of the thrust members (20) comes to bear against at least one of these sliders (8) and exerts a thrust on this slider to assist the displacement of this slider along the rail (5*e*) on which this slider moves.

10 Claims, 8 Drawing Sheets

STRETCHING MACHINE FOR STRETCHING THERMOPLASTIC FILMS

The present invention relates to a machine for stretching films made of thermoplastic material, and more particularly to a machine simultaneously stretching a thermoplastic film in the longitudinal direction and in the transverse direction. The invention also relates to a method for effecting stretching of a thermoplastic film using this machine.

BACKGROUND OF THE INVENTION

It is well known to stretch a film of synthetic thermoplastic material by means of a machine that simultaneously stretches the film in the longitudinal direction and in the transverse direction, whereas the material of the film is made malleable by heating.

Such a machine is shown schematically and very simplified in FIG. 1 as seen from above; FIG. 2 shows a portion of this machine on an enlarged scale, and FIG. 3 shows a perspective view of an assembly for gripping and stretching the film.

As shown in FIG. 1, the machine 1 essentially comprises, in a manner well known per se:
a heating tunnel 2 allowing the heating of the plastic material of the film F to be stretched;
two endless gripper circulation paths 3 for gripping the lateral edges of the film F. and located on either side of the path of the film F in the tunnel 2; wherein each path 3 has an inner longitudinal portion 3 *a* extending for the most part inside the tunnel 2, and an outer longitudinal portion 3 *b* extending outside the tunnel 2, and comprising a pair of guide rails 5 *i*, 5 *e*, each in the form of a band of metal of rectangular cross section: wherein one of these rails 5 *i* is referred to as "inner", i.e. the closest to the edge of the film F, while the other rail 5 *e* is referred to as "outer", i.e. further from the edge of this film F.

As is more particularly visible in FIGS. 2 and 3, the grippers 4 are mounted on first sliders 6 traveling along the inner guide rail 5*i*; wherein these first sliders 6 are connected to pairs of rods 7, which are themselves connected to second sliders 8 traveling along the outer guide rail 5*e*.

The sets of grippers 4/sliders 6, 8/rods 7 extend over all the paths 3, while only some of them are represented in FIG. 1. The movement of these assemblies along the rails 5*i*, 5*e* of a path 3 is carried out by means of an endless chain connected to these assemblies, and circulating on drive wheels 11 located outside the heating tunnel 2.

With particular reference to FIG. 2, it is understood that the distance separating the two rails 5*i*, 5*e* from one another is not constant along the inner longitudinal portion 3*a*, and that the outer rail 5*e*, on a part of this portion intended to effect longitudinal contraction of the film F, progressively diverges from the rail 5*i*; wherein this divergence makes it possible to increase the distance of the sliders 8 with respect to the sliders 6, and thus to close the rods 7 and, in so doing, progressively bring the successive grippers 4 closer to one another thus achieving the longitudinal contraction of the film F, wherein this contraction is commonly referred to as "negative stretching".

Returning to FIG. 1, it appears that the rails 5*i*, 5*e* of the same pair of rails, in an anterior part of the two internal portions 3*a*, diverge from one another to effect a negative stretching of the film F, then converge towards each other to effect a positive stretching of the film F.

Still referring to FIG. 1, it appears, moreover, that the pairs of rails 5*i*, 5*e* of the two inner portions 3*a* are simultaneously deflected and move away from one another on a part of the inner portions 3*a* and thus effect a transverse stretching of the film F, wherein the downstream parts of these two inner portions 3*a* may remain in a position at a distance from one another, so that the transverse stretching is maintained, or they may, as shown in FIG. 1, converge towards one another.

The two rails 5*i*, 5*e* of the same pair of rails are able to deform transversely allowing mutual variations of distance and their aforementioned deflections, wherein the rails are mounted on means for adjusting the respective distance of one rail relative to the other (not visible in FIGS. 1 to 3), in order to adjust the degree of positive or negative longitudinal stretching of the film F, wherein the pairs of rails 5*i*, 5*e* of the inner portions 3*a* are also mounted on successive base plates 9 that are articulated with respect to each other and whose positions relative to the film F may be adjusted in the transverse direction of the film, in order to adjust the degree of transverse stretching of the film F.

Some films have to be stretched at relatively low temperatures, which requires significant stretching efforts. Some special films require simultaneous transverse stretching and a negative longitudinal stretching, i.e. involving the passage of the sliders 6, 8 on portions of the rails 5*i*, 5*e* diverging from one another. Considerable forces are then generated on the system of endless chains and wheels 11 driving the assemblies of sliders 6, 8/rods 7, taking into account the progressive convergence of the rods 7.

These very significant forces result in a variation of the intervals between the grippers on one side or the other of the film, which directly influences the properties of the stretched film and, consequently, the final quality of the film thus obtained. As a result, current machines only allow low levels of negative stretching and are unable to meet changing market demand for films requiring negative stretching rates, that may be sometimes very significant.

Furthermore, the existing system involves a mechanical operation to adapt to the different gripper spacing values that are required for the different types of films to be stretched and the different degrees of stretching to be effected, which represents a very important practical constraint.

In addition, on an existing machine, the minimum spacing that may be adopted between successive grippers remains relatively limited, which consequently limits the degrees of stretching that may be implemented, while there is a need for lower degrees of stretching than this machine allows.

OBJECTS OF THE INVENTION

The present invention aims to resolve the essential drawbacks aforementioned.

SUMMARY OF THE INVENTION

The machine in question is of the aforementioned type, and comprises:
a heating tunnel for heating the plastic material of the film to be stretched;
two endless circulation paths of grippers for gripping the lateral edges of the film located on either side of the path of the film in the heating tunnel, wherein each path has an inner longitudinal portion extending partly inside the heating tunnel, and an outer longitudinal portion extending outside the heating tunnel, and comprising a pair of guide rails, one of which is said to be "inner", i.e. closer to the edge of the film, while the other is said to be "outer", i.e. further from the edge of this film;

wherein the grippers for the lateral edges of the film are mounted on first sliders running along the inner guide rail;

pairs of connecting rods connecting these first sliders to second sliders running along the outer guide rail.

According to the invention, the machine comprises at least one assistance subassembly located in the heating tunnel, comprising:

an endless chain or belt;

a plurality of thrust members connected to the chain or belt in succession and projecting from this chain or belt, and a drive means of this chain or belt, wherein the assistance subassembly is arranged in such a way that a thrust part of the chain or belt is located close to the sliders, and the drive means driving the chain or belt, so that said part of the chain moves in the vicinity of these sliders in the same direction as the direction of travel of these sliders, several thrust members carried by said part of the chain are thus brought into the path of the sliders, so that at least one of the thrust members comes to bear against at least one of these sliders and exerts a thrust on this slider to assist the displacement of this slider along the rail on which this slider moves.

The inventor has identified the fact that the significant forces generated on the drive chains according to the prior art, generate deformations of these chains, which have significant lengths, and that these deformations are at the origin of the variation of the intervals of the grippers occurring on either side of the film. The inventor was then able to design at least one localized assistance subassembly inside the heating tunnel, that act directly on the sliders and relieve the drive chain of the path on which this subassembly is located.

In addition, it appears that by virtue of an assistance subassembly according to the invention, it is possible to adopt a spacing of two successive grippers that is smaller than the minimum spacing between two successive grippers, which allows a machine in accordance to the prior art.

Preferably, each thrust member comprises a free end part which is movable relative to a base part connected to the chain or belt, wherein this mobility is effective between an extension position of the free end part relative to the base part, in which the thrust member is able to exert thrust against a slider, and a retracted position of the free end part with respect to this base part, in which the free end part is removed with respect to a slider, and wherein resilient means act on each free end part, in order to normally hold this free end part in the extended position.

It is indeed possible, as a function of the stretching of the film to be effected, and therefore according to the position that a slider is able to have with respect to a thrust member brought by the chain or belt in a position to exert thrust, that the thrust member is exactly opposite this slider; in such a situation, the ability of the thrust member to retract prevents this conflict and therefore any risk of damage to the thrust member.

In the absence of this arrangement, the machine according to the invention remains usable but some stretching adjustments can not be implemented because they are likely to generate conflicts between the sliders and the thrust members. With this arrangement, any conflict simply causes a retraction of the thrust member and another thrust member exerts a thrust on another slider.

This same possibility of retraction of a thrust member allows, in the event of excessive forces, removal of the thrust member, and thus disengagement of the assistance subassembly. This disengagement avoids the risk of damage to the machine.

Preferably, the machine according to the invention comprises a plurality of assistance subassemblies as mentioned above, wherein each has a length less than the length of the zone of an inner longitudinal portion where stretching of the film may be effected. This length may, in particular, be substantially less than a quarter of the length of such a zone, and preferably less than one eighth, or less, of this length.

It is to be understood that the length of an assistance sub-assembly is equivalent to the distance separating the longitudinal ends formed by the endless chain or belt.

Preferably, in the case of such a plurality of assistance subassemblies, the assistance subassemblies face each other in the transverse direction to the forward direction of the film, in order to balance the thrust they exert on the sliders on both sides of the film.

Advantageously, the portion of a slider against which a thrust member is adapted to exert thrust is in the form of a roller.

Such a roller makes it possible to favor the escape of the free end part with respect to the slider in the event of conflict with this slider or in the event of excessive forces.

Preferably, each assistance subassembly comprises electronic means for limiting the driving torque exerted by the driving means on the chain or belt.

These limiting means make it possible to prevent the assistance subassembly from being jolted in the event of a thrust member protruding beyond a corresponding slider, this displacement resulting from the fact that the intervals between the sliders move along said thrust part of the chain or belt while the intervals between the thrust members are fixed; such jolting is undesirable, both with respect to the steadiness of the stretching of the film, as well as the mechanical strength of the assistance subassembly. The traction force provided by the assistance subassembly is thus adjusted optimally.

According to one possibility, the thrust members may comprise magnets while the rollers may be of a magnetic material, or vice versa, to achieve a magnetic bonding of the thrust members to the rollers. This bonding improves the contact between each thrust member and a corresponding roller.

Preferably, each assistance subassembly comprises a support structure against which said thrust part of the chain or belt may bear.

This structure thus helps prevent any risk of bowing of the chain or belt, i.e. deformation of the chain or belt on the side opposite the sliders, and thus any risk of escape of the thrust members from their position of engagement with the sliders. In fact, in view of the forces experienced by the chain or belt, and taking into account the flexibility of this chain or belt, such bowing could occur in the absence of the support structure, and could therefore lead to insufficient engagement of the thrust members with the sliders. This could result in a risk of damage to these thrust members, or even a risk of escape of the thrust members from engagement with the sliders.

According to an advantageous embodiment of the invention, each assistance subassembly comprises a drive motor for the chain or belt, wherein this motor is placed in a thermal protection enclosure.

The link between the motor and the chain or belt is thus quite direct and eliminates the risk of deformation in the transmission between the engine and the chain or belt, wherein such deformation is liable to render the assistance provided by the assistance subassembly inaccurate or inefficient. Placing the motor in a thermal protection enclosure enables the motor and the peripheral systems necessary for the operation of this motor, to withstand the temperature in the heating tunnel.

If necessary, this thermal protection enclosure may be cooled.

Preferably, each assistance subassembly comprises means for varying the speed of the drive motor and means for detecting the speed of movement of the sliders upstream and downstream of this assistance subassembly, these detection means being connected to a central control unit of the means for variation of the motor speed.

The measurements made by the two detection means allow the central unit to determine whether the current stretching is positive or negative stretching, and to adapt the motor speed accordingly. The speed of the drive motor, and thus the speed of movement of the thrust members, is thus adapted in real time to the movement of the sliders. If it is determined that the current stretching is negative stretching, the central unit acts on the motor speed so that the speed of movement of the thrust members is greater than that of the sliders at said thrust part of the chain or belt.

This higher displacement speed of the thrust members ensures that at least one thrust member engages with a slider and exerts a thrust on the slider at said part of the chain.

If it is determined that the current stretching is positive stretching, the motor speed will also be adapted to provide the required assistance.

The invention also relates to a method for effecting the stretching of a thermoplastic film comprising the steps of:

using the machine described above that comprises at least one assistance subassembly including the means for varying the speed of the drive motor of this assistance subassembly and the means for detecting the speed of displacement of the sliders upstream and downstream of this assistance subassembly, and adjusting the speed of the drive motor by means of the variator that is itself controlled by the central unit, as a function of the detections by the means for detecting the speed of movement of the sliders, so that, in the event of detection of negative stretching, this speed is such that the speed of said thrust part of the chain or belt is a linear speed greater than the linear speed of the sliders at the same part of the chain.

By virtue of this higher speed, at least one thrust member at said part of the chain engages with a slider and exerts a thrust on the slider.

BRIEF DESCRIPTION OF THE DRAWINGS

The invention will be better understood, while other features and advantages thereof will become apparent by reference to the accompanying schematic drawing, this drawing showing, by way of a non-limiting example, a preferred embodiment of the mechanism concerned; in the drawing.

DESCRIPTION OF THE PREFERRED EMBODIMENTS

Figure 1:
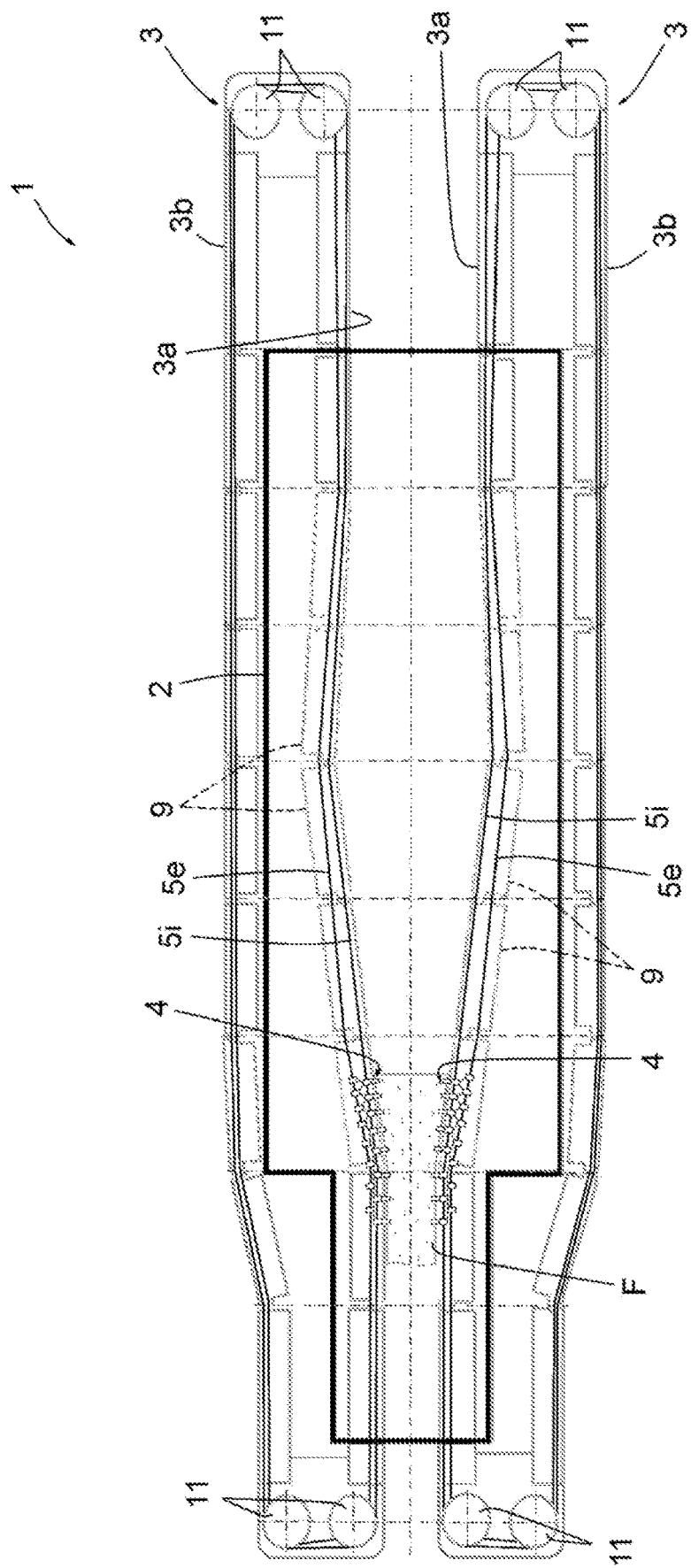
FIG. 1 shows a top view of a known machine, shown schematically and in a very simplified manner.
Figure 2:
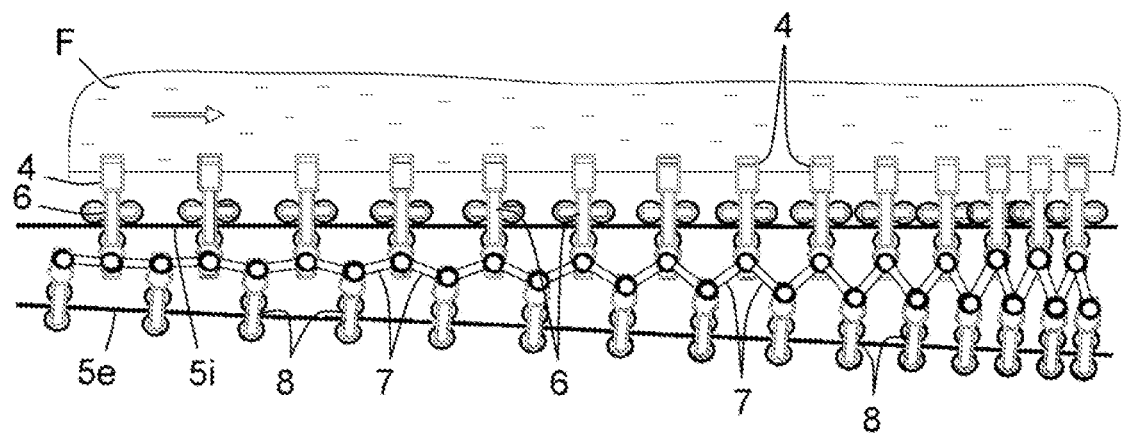
FIG. 2 shows a top view, also schematic and very simplified, of a portion of this machine on an enlarged scale.
Figure 3:
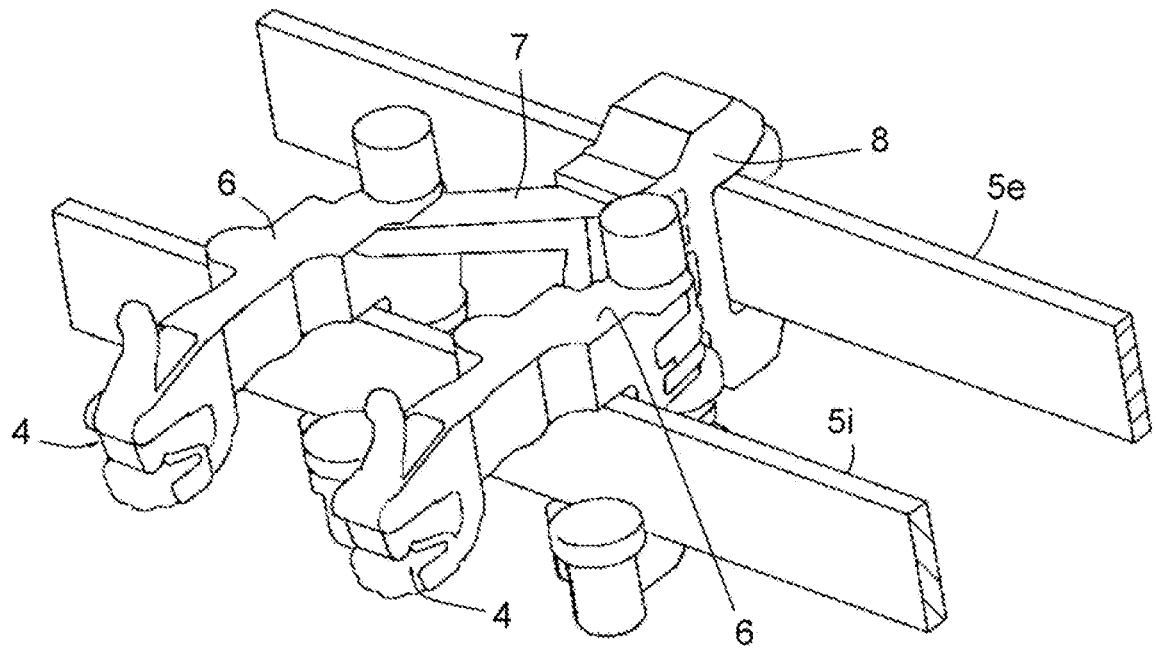
FIG. 3 shows a perspective view of a film gripping and stretching assembly of this known machine.
Figure 4:
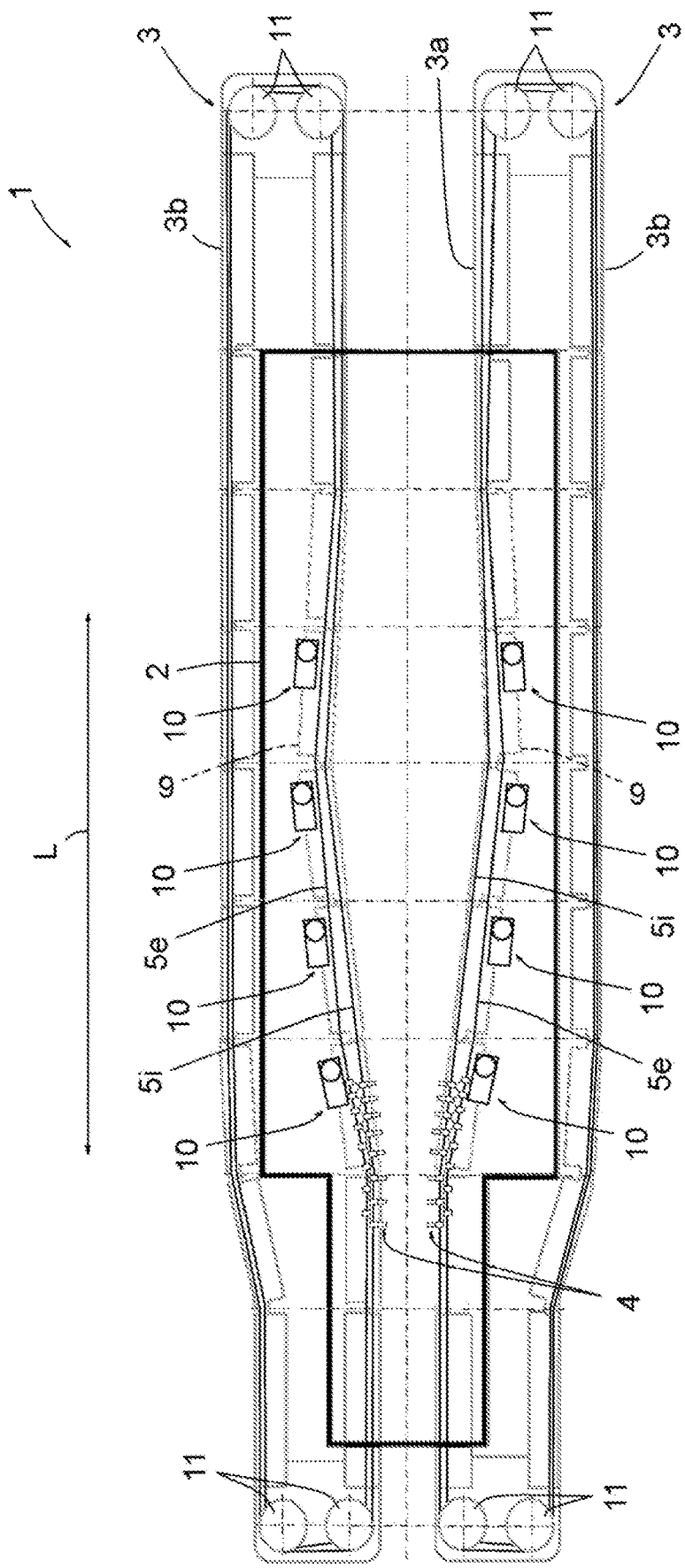
FIG. 4 shows a view of the machine according to the invention, similar to FIG. 1.

FIG. 4 shows the machine 1 according to the invention, which has the same basic general structure as the machine 1 described with reference to FIGS. 1 to 3, but which comprises subassemblies 10 to assist the sliding of the sliders 6, 8 on the rails 5$i$, 5$e$; the elements or parts already described, which, as they are identical, will not be described again but will simply be designated by the same reference numbers.

In the example shown, the machine 1 comprises eight subassemblies 10, each of which is located in the heating tunnel 2 and arranged on a base 9 near the outer rail 5$e$. As may be seen, the subassemblies 10 face each other in a direction transverse to the forward direction of the film. Each of them has a length much shorter than the length L of the zone of an internal longitudinal portion 3$a$ where stretching of the film is to be effected, wherein the length of each subassembly 10 is, in the example shown, of the order of one tenth of the length L of this zone.

Figure 5:
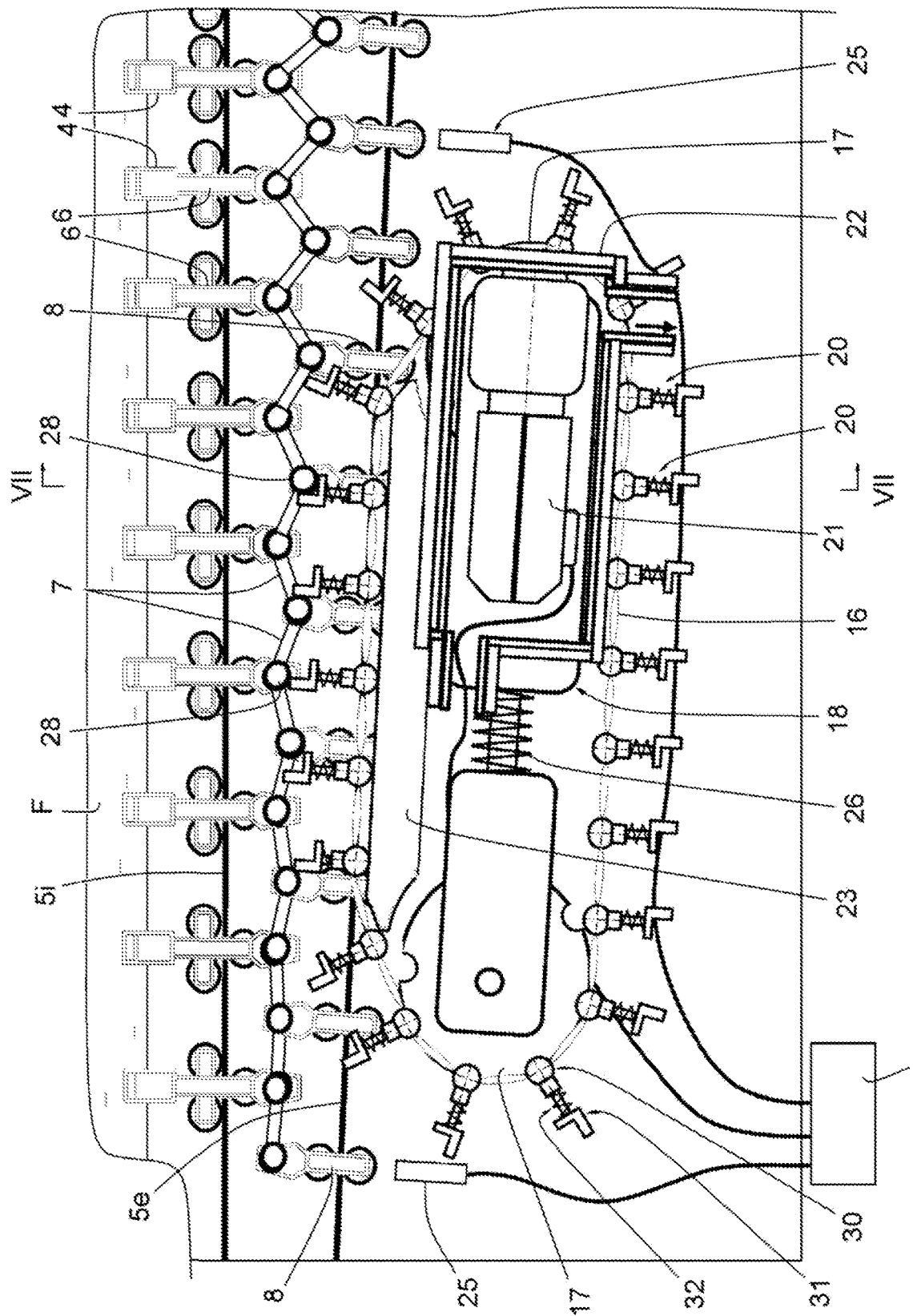
FIG. 5 shows a view similar to FIG. 2, particularly showing one of the assistance subassemblies of this machine.

With reference to FIG. 5, it appears that an assistance subassembly 10 comprises:

an endless chain 16 traveling on two wheels 17 carried by a frame 18;

a plurality of thrust members 20, connected to the chain 16 in succession and protruding from this chain, on the outside thereof;

a geared motor 21 for driving one of the wheels 17, located in a thermal protection enclosure 22;

a support structure 23;

a central control unit 24 for the geared motor 21, located outside the heating tunnel 2; and two sensors 25 to detect the speed of travel of the sliders 8.

As shown, the frame 18 is in two parts and extends longitudinally in a direction parallel to that of the rail 5$e$. One of the parts of the frame 18 comprises the geared motor 21, and one of the two wheels 17 is directly connected to this geared motor and is driven by it; the other part of the frame 18 comprises the other wheel 17. These two parts are connected to one another telescopically and a spring 26 is interposed between them to exert a thrust on these two parts that tends to move them apart from one another and ensure permanent tensioning of the chain 16.

Figure 6:
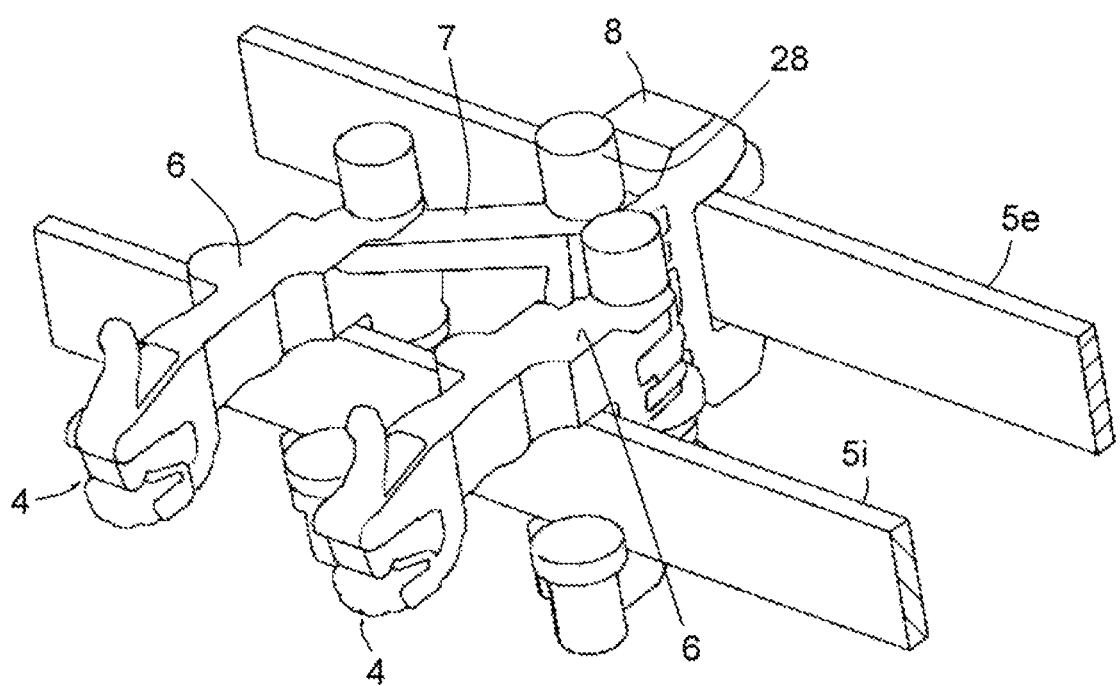
FIG. 6 shows a view similar to FIG. 3.

The chain 16 comprises the thrust members 20 that are attached to it. The subassembly 10 is arranged beyond the rail 5$e$ but in the immediate vicinity thereof, so that an part of the chain 16 lies parallel to the rail 5$e$ and is located near the sliders 8; it is also shown that the protrusion of each thrust member 20 with respect to the chain 16 enables at least one thrust member 20 to engage with rollers 28 which comprise the sliders 8, at said part of the chain. FIG. 6 shows more particularly such a roller 28.

Figure 7:
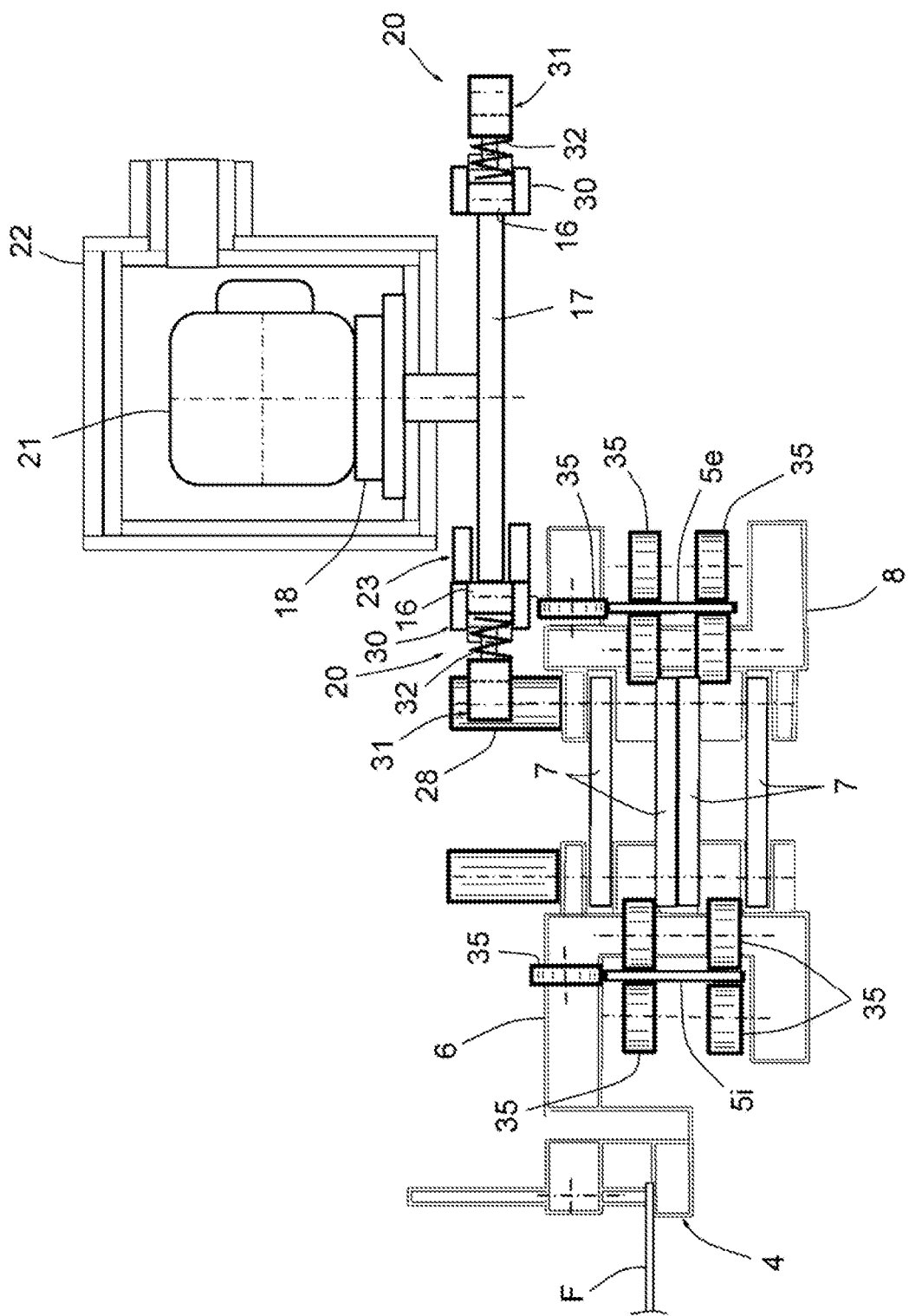
FIG. 7 shows a sectional view along the line VII-VII of FIG. 5.
Figure 8:
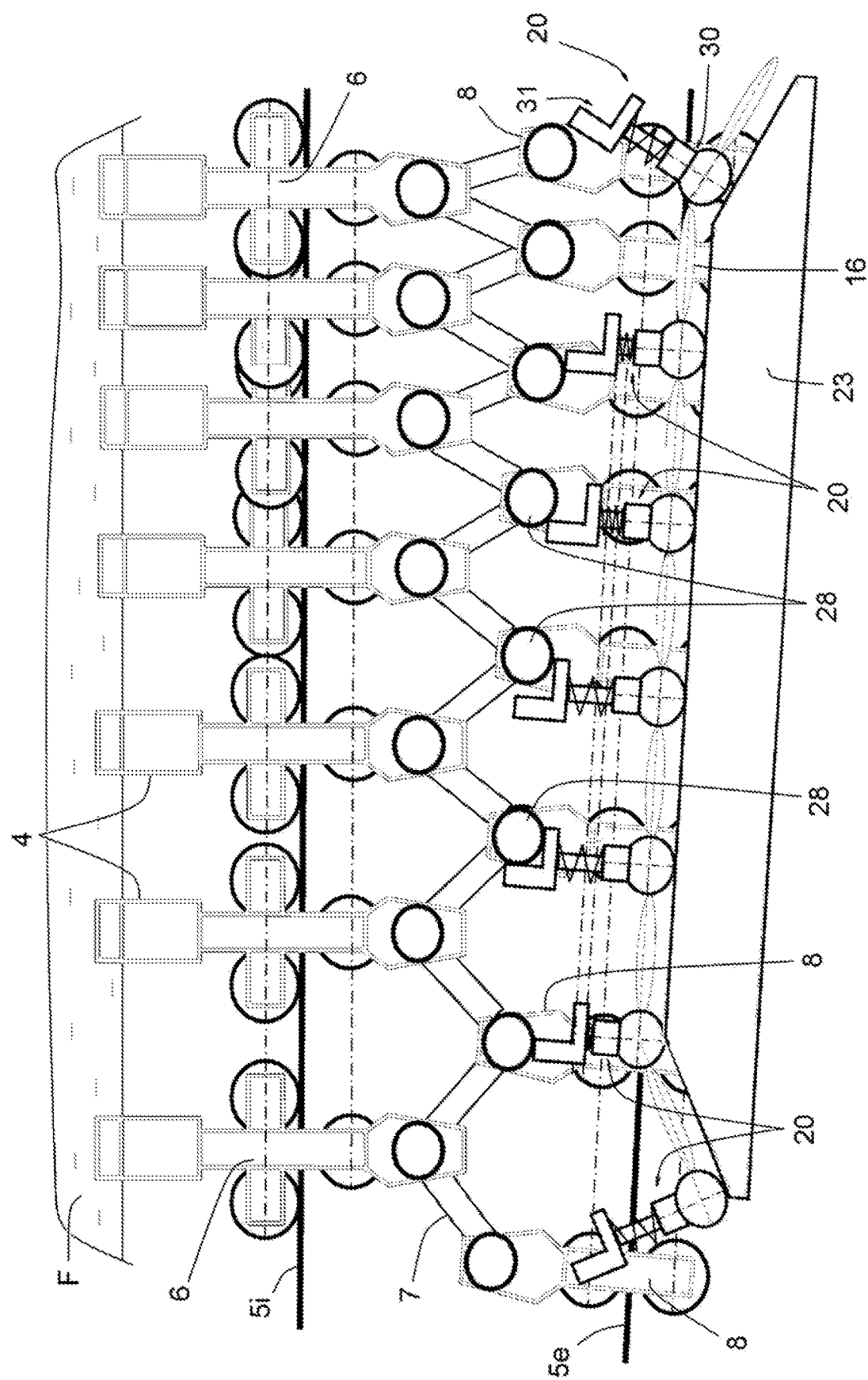
FIG. 8 shows a view similar to FIG. 5, on an enlarged scale.

As shown in FIGS. 5, 7 and 8, each thrust member 20 comprises a base part 30 connected to the chain 16 and a free end part 31 telescopically connected to the base part 30.

Each base part 30 forms a smooth lower portion allowing sliding of the thrust member 20 against the bearing structure 23. Each free end part 31 has a slidably-engaged rod in the base part 30, and an end part having a shape arranged to bear against the corresponding roller 28 of a slider 8; this shape is that of an L in the example shown. Each thrust member 20 further comprises a spring 32 interposed between the base part 30 and the free end part 31 in order to exert pressure on the base part 30 and the free end part 31 and normally maintain the free end part in an extended position relative to the base part 30.

It may be seen in FIG. 8 that each free end part 31 is arranged to be brought into a retracted position by sliding of the rod in the base part 30 against the elastic force of the spring 32 in the event of a conflict between a roller 28 of a slider 8 and the free end part 31.

FIG. 7 also shows the various rollers 35 which allow the rolling of the slides 6 and 8 along the rails 5i and 5e.

The geared motor 21 is of the conventional type that is well known per se, and therefore does not have to be described in detail. It comprises a speed variator.

The thermal protection enclosure 22 has insulating linings and is connected to a ventilation system (not shown) with air inlet and outlet openings.

The control unit 24 of the geared motor 21 comprises electronic means for processing the signals transmitted by the sensors 25, electronic means for controlling the speed variator as a function of the speed detected by the sensors 25, and electronic means for limiting the torque exerted by the geared motor 21 on the wheel 17.

Figure 9:
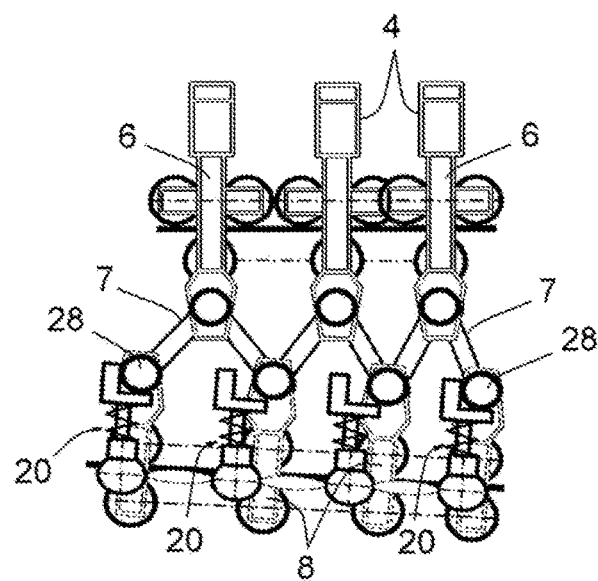
FIGS. 9 to 11 shows views of different engagement situations of thrust members with sliders of the machine.

In practice, the measurements made by the two sensors 25 allow the central unit 24 to determine whether the current stretching is positive or negative stretching, and to adapt the speed of the gear motor 21 accordingly. The speed of the latter, and thus the speed of travel of the thrust members 20, is thus adapted in real time to the displacement of the sliders 8. If it is determined that the current stretching is negative stretching, the central unit 24 acts on the speed the geared motor 21 so that the speed of movement of the thrust members 20 at the active part of the chain 16 is slightly greater than that of the sliders 8 at said part of the chain. This slightly higher speed causes at least one of the thrust members 20 on the chain active part 16 to bear against the roller 28 of a slider 8 and to exert a thrust on the slider via this roller as shown in FIG. 9. This thrust assists the movement of the sliders 8, and thus also the sliders 6 connected to them, along the rails 5i and 5e, thus relieving the main drive chain of the slider assemblies 6, 8 and connecting rods 7. This assistance allows the sliders 6, 8 to move appropriately along the rails 5i, 5e even under strong forces, particularly when stretching films at relatively low temperatures, or when it is necessary to simultaneously implement transverse stretching and negative longitudinal stretching, and, therefore, the sliders 6 and 8 must move along on the rails 5i, 5e which diverge and which deflect outwards.

The bearing structure 23 opposes any bowing of the chain 16 during the application of this thrust, thus eliminating the risk, in normal situation, of thrust members 20 escaping from the rollers 28 and the risk of damage of these thrust members in the event of the thrust surface being too small.

Figure 10:
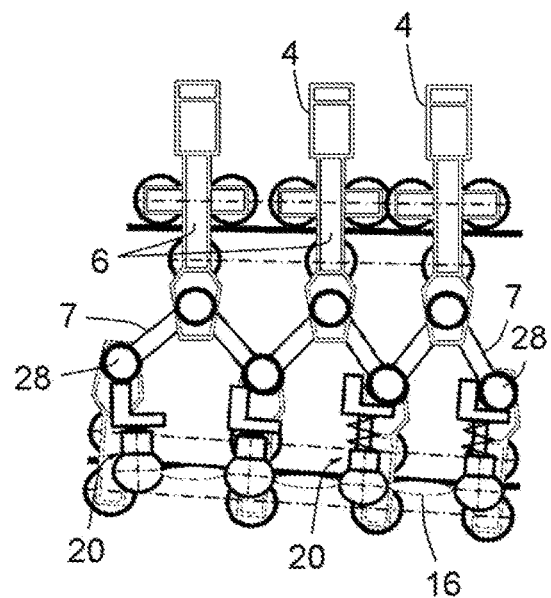
Figure 11:
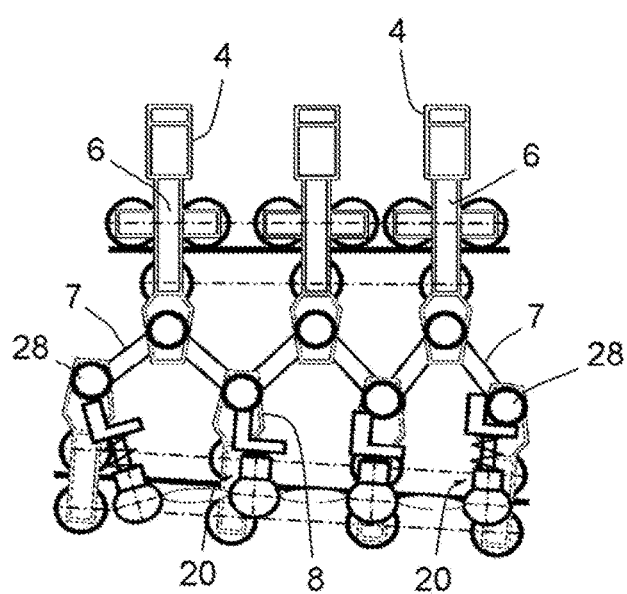

If a thrust member 20 comes into conflict with a roller 28, as may be seen in FIG. 10 or 11, the possibility of retraction of the free end part 31 of the thrust member 20 makes it possible to avoid any damage to the latter; the reduction of the intervals between the sliders 8 as the sliders move along the rail 5e causes at least one member 20 located in front of the member 20 subject to the conflict to achieve a corresponding situation of thrusting of a roller 28 along the said active part of the chain 16.

In the event of excessive force being exerted on the thrust members 20, the escape of these thrust members 20, and thus disengagement of the assistance subassembly, is also made possible, thus avoiding the risk of damage to the machine 1, this disengagement being favored by the rotation of the roller 28.

The electronic means for limiting the torque exerted by the geared motor 21 on the wheel 17 which comprises the central unit 24, makes it possible to prevent the assistance subassembly 10 from jolting when a member 20 passes beyond a corresponding slider 8, or in the event of the escape of this member 20 relative to the slide 8. Such jolting would be detrimental to the quality of the stretching obtained and the mechanical strength of the assistance subassembly 10.

If the sensors 25 determine that the current stretching is positive stretching, the speed of the geared motor 21 will also be adapted to provide the required assistance, if necessary.

The invention thus provides a machine having the decisive advantage, compared with machines according to the prior art, of allowing significant negative stretching rates, without the risk of generating inaccuracy in the positioning of the grippers, wherein this machine also has the decided advantage of not requiring a mechanical intervention for adaptation to the different gripper interval values that are required according to the different types of films to be stretched.

The invention has been described above with reference to an embodiment provided by way of an example. It goes without saying that the invention is not limited to these embodiments, and the scope of protection is defined by the appended claims.

What is claimed is:

1. A machine for stretching films made of thermoplastic material comprising:
    a heating tunnel for heating a plastic material of the film to be stretched;
    two endless paths for the circulation of grippers capable of gripping the lateral edges of the film located on either side of the path of the film in the heating tunnel;
    each endless path has an inner longitudinal portion extending partly inside the heating tunnel, and an outer longitudinal portion extending outside the heating tunnel, and comprising an inner guide rail closer to the edge of the film and an outer guide rail further from the edge of this film;
    the grippers for the lateral edges of the film are mounted on first sliders running along the inner guide rail;
    pairs of connecting rods connecting the first sliders to second sliders running along the outer guide rail;
    at least one assistance subassembly located in the heating tunnel, comprising:
    an endless chain or belt;
    a plurality of thrust members connected to the chain or belt in succession and projecting from this chain or belt, and
    a drive device of this chain or belt,
    the assistance subassembly being arranged that a thrust part of the chain or belt is located close to the second sliders, and the drive device driving the chain or belt so that said thrust part of the chain or belt moves in the vicinity of the second sliders in the same direction as the direction of travel of the second sliders, several thrust members carried by said thrust part of the chain or belt are thus brought into the path of the second sliders, so that at least one of the thrust members comes to bear against at least one of the second sliders and exerts a thrust on the second slider to assist the displacement of the second slider along the rail on which the second slider moves.

2. The machine according to claim 1, wherein each thrust member comprises a free end part which is movable relative to a base part connected to the chain or belt; the mobility is effective between an extension position of the free end part relative to the base part, in which the thrust member is capable to exert thrust against one second slider, and a retracted position of the free end part with respect to the base part, in which the free end part is removed with respect to the second slider; a resilient device act on each free end part, in order to normally hold the free end part in the extended position.

3. The machine according to claim 1, wherein the machine comprises a plurality of assistance subassemblies, wherein each assistance subassembly has a length less than the length of the zone of the inner longitudinal portion where stretching of the film may be effected, in particular a length substantially less than a quarter of the length of such a zone.

4. The machine according to claim 3, wherein the assistance subassemblies face each other in the transverse direction to the forward direction of the film.

5. The machine according to claim 1, wherein the portion of one second slider against which a thrust member is adapted to exert thrust is in the form of a roller.

6. The machine according to claim 1, wherein each assistance subassembly comprises electronic devices for limiting the driving torque exerted by the driving means on the chain or belt.

7. The machine according to claim 1, wherein each assistance subassembly comprises a support structure against which the thrust part of the chain or belt may bear.

8. The machine according to claim 1, wherein each assistance subassembly comprises a drive motor for the chain or belt, wherein the motor is placed in a thermal protection enclosure.

9. The machine according to claim 8, wherein the thermal protection enclosure is cooled.

10. The machine according to claim 1, wherein each assistance subassembly comprises devices for varying the speed of the drive motor and a detection devices for detecting the speed of movement of the sliders upstream and downstream of the this assistance subassembly, wherein the detection devices are connected to a central control unit of the device for variation of the motor speed.

* * * * *